United States Patent
Lee

(10) Patent No.: US 8,270,935 B2
(45) Date of Patent: Sep. 18, 2012

(54) METHOD AND SYSTEM FOR PROLONGING EMERGENCY CALLS

(75) Inventor: Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 941 days.

(21) Appl. No.: 11/999,547

(22) Filed: Dec. 5, 2007

(65) Prior Publication Data

US 2009/0149153 A1    Jun. 11, 2009

(51) Int. Cl.
*H04M 11/04* (2006.01)
(52) U.S. Cl. ............ 455/404.1; 455/404.2; 455/410; 455/411; 455/414.2; 455/412.1; 455/422.1
(58) Field of Classification Search .......... 455/404.1, 455/575, 563, 565
See application file for complete search history.

(56) References Cited

U.S. PATENT DOCUMENTS

| | | | |
|---|---|---|---|
| 6,408,172 B1 * | 6/2002 | Alperovich et al. | 455/404.1 |
| 6,427,072 B1 * | 7/2002 | Reichelt | 455/404.1 |
| 7,080,779 B2 * | 7/2006 | Cummings | 235/386 |
| 2006/0023848 A1 * | 2/2006 | Mohler et al. | 379/41 |

* cited by examiner

*Primary Examiner* — Olumide T Ajibade Akonai
*Assistant Examiner* — Randy Peaches
(74) *Attorney, Agent, or Firm* — Park, Vaughan, Fleming & Dowler LLP

(57) ABSTRACT

Some embodiments of the present invention provide a system that processes a phone call. During operation, the system connects the phone call from a mobile phone and determines whether the phone call is an emergency call. If the phone call is an emergency call, the system activates an emergency mode of the mobile phone to handle the phone call, which prolongs the length of the phone call.

22 Claims, 8 Drawing Sheets

METHOD AND SYSTEM FOR PROLONGING EMERGENCY CALLS

BACKGROUND

1. Field

The present invention generally relates to mobile phones. More specifically, the present invention relates to a method and system for prolonging emergency calls on mobile phones.

2. Related Art

Mobile phones are becoming increasingly versatile and are presently able to support a variety of applications and store large amounts of documents, media, and/or other files in various formats. For example, a high-end mobile phone may support a web browser, a portable media player, an email client, a document editor, and a global positioning system (GPS) receiver.

The various features of a mobile phone may require specific hardware components such as a high-speed processor, memory, a high-resolution display screen, multiple wireless transceivers, one or more input devices, and/or multiple sensors. Furthermore, each component on the mobile phone may require additional power from the mobile phone's battery to operate. For example, battery power may be consumed by multiple active sensors, input/output (I/O) devices, wireless transceivers, and/or software applications on the mobile phone, even when such components are not needed by the user of the mobile phone. The resulting higher consumption rate of battery power may lead to an earlier shutdown of the mobile phone, and may prevent the user from using one or more features of the mobile phone. This may create problems during emergency phone calls, in which staying connected may be critically important.

SUMMARY

Some embodiments of the present invention provide a system that processes a phone call. During operation, the system connects the phone call from a mobile phone and determines whether the phone call is an emergency call. If the phone call is an emergency call, the system activates an emergency mode of the mobile phone to handle the phone call, which prolongs the length of the phone call.

In some embodiments, the emergency mode makes the phone call harder to disconnect.

In some embodiments, the emergency mode preserves battery power on the mobile phone.

In some embodiments, the battery power is preserved by:
 (i) disabling non-essential hardware components on the mobile phone,
 (ii) reducing power to a display screen of the mobile phone,
 (iii) disabling software applications on the mobile phone, or
 (iv) reducing processor speeds on the mobile phone.

In some embodiments, the emergency mode enables emergency phrase buttons on the mobile phone.

In some embodiments, the phone number is stored as an emergency number in the mobile phone.

In some embodiments, the emergency mode can be selected by a user of the mobile phone.

In some embodiments, the phone call is determined to be an emergency call based on a phone number associated with the phone call.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

In general, embodiments of the invention provide a method and system for processing phone calls connected from a mobile phone. Specifically, embodiments of the invention provide a method and system for prolonging emergency calls to or from the mobile phone. In one or more embodiments of the invention, an emergency mode is activated once a phone call is determined to be an emergency call. In addition, the emergency status of the phone call may be determined based on a phone number associated with the phone call, or the emergency mode may be selected by a user of the mobile phone. Once in emergency mode, the mobile phone may make the phone call harder to disconnect. The mobile phone may also enable a set of emergency phrase buttons for the user to press if the user is unable to speak. In addition, the mobile phone may preserve battery power during the emergency call by disabling non-essential hardware components, reducing power to a display screen on the mobile phone, disabling software applications, and/or reducing processor speeds.

Figure 1:
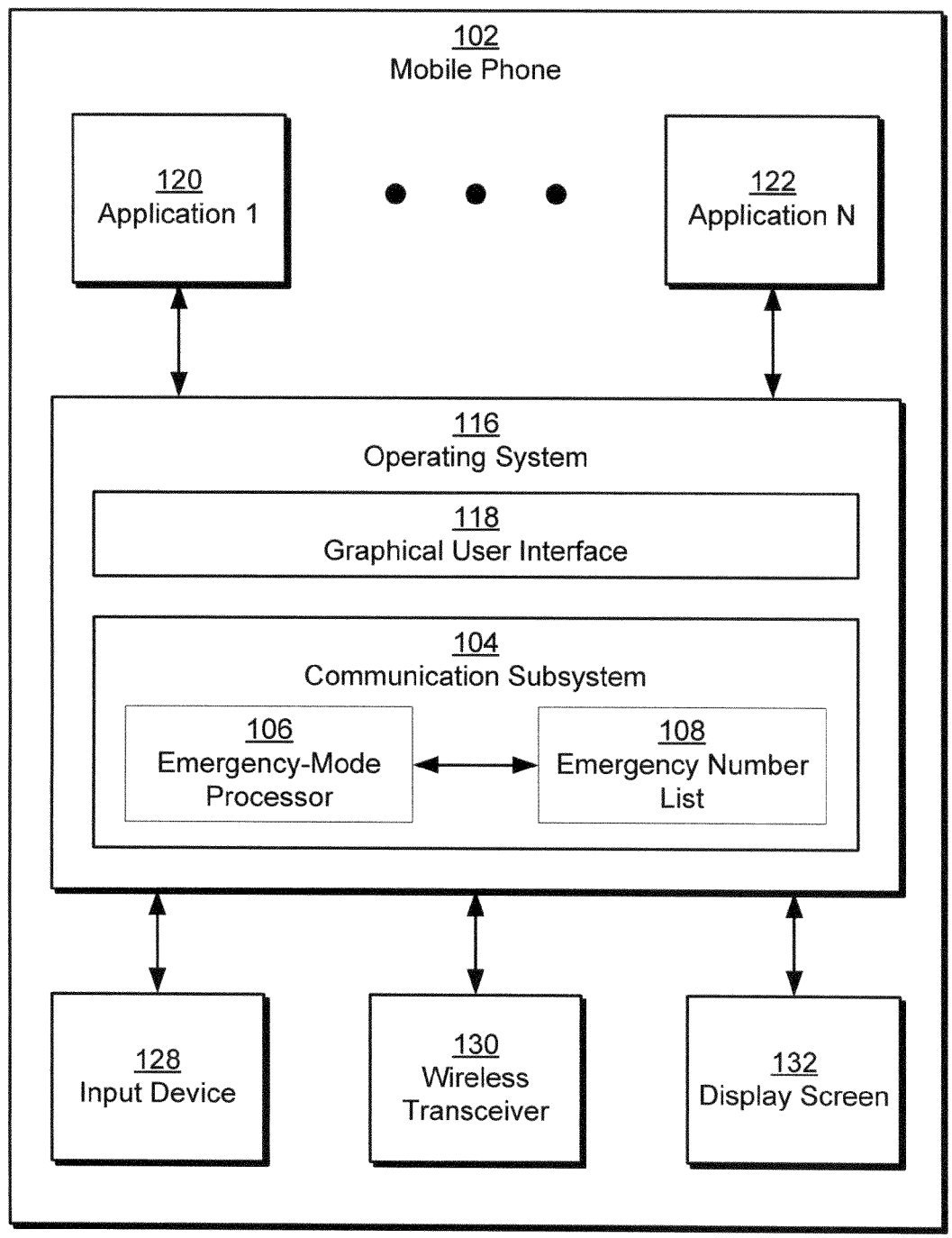
FIG. 1 shows a schematic of a mobile phone in accordance with an embodiment of the present invention.

FIG. 1 shows a schematic of a mobile phone in accordance with an embodiment of the present invention. As shown in FIG. 1, mobile phone 102 includes an operating system 116, an input device 128, a wireless transceiver 130, a display screen 132, and multiple applications (e.g., application 1 120, application n 122). Each of these components is described in further detail below.

Mobile phone 102 may correspond to a portable electronic device that provides communication and other services or functions to a user. For example, mobile phone 102 may provide functionality as a communications device, portable computer, global positioning system (GPS) receiver, portable media player, and/or graphing calculator. In addition, mobile phone 102 may include an operating system 116 that coordinates the use of hardware and software resources on mobile phone 102, as well as one or more applications (e.g., application 1 120, application n 122) that perform specialized tasks for the user. For example, mobile phone 102 may include applications such as an email client, an address book, a document editor, and/or a media player. To perform tasks for the user, applications may obtain access to hardware resources (e.g., processor, memory, I/O components, wireless transceiver, etc.) on mobile phone 102 from operating system 116. Applications may also interact with the user through a hardware and/or software framework provided by operating system 116, as is described below.

To enable interaction with the user, mobile phone 102 may include one or more hardware input/output (I/O) components, such as input device 128, wireless transceiver 130, and display screen 132. Each hardware I/O component may additionally be associated with a software driver (not shown) that allows operating system 116 and/or applications on mobile phone 102 to access and use the hardware I/O components.

Display screen 132 may be used to display images and/or text to one or more users of mobile phone 102. In one or more embodiments of the invention, display screen 132 serves as the primary hardware output component for mobile phone 102. For example, display screen 132 may allow the user(s) to view menus, icons, windows, emails, websites, videos, pictures, maps, documents, and/or other components of a graphical user interface (GUI) 118 provided by operating system 116. Those skilled in the art will appreciate that display screen 132 may incorporate various types of display technology to render and display images. For example, display screen 132 may be a liquid crystal display (LCD), an organic light-emitting diode (OLED) display, a surface-conducting electron-emitter display (SED), and/or other type of electronic display.

Input device 128 may function as the primary hardware input component of mobile phone 102. Specifically, input device 128 may allow the user to point to and/or select one or more areas of display screen 132 using a cursor, highlight, and/or other visual indicator. Input provided by the user using input device 128 may be processed by the corresponding software driver and sent to operating system 116 and/or one or more applications (e.g., application 1 120, application n 122) as one or more actions.

Input device 128 may receive user input using various methods, including touchscreens, touchpads, buttons, voice recognition, keypads, keyboards, and/or other input methods. In addition, multiple input devices may exist on mobile phone 102. Operating system 116 and/or the application(s) (e.g., application 1 120, application n 122) may use the input from the input device(s) to perform one or more tasks, as well as update GUI 118 in response. Images corresponding to GUI 118 may be sent by operating system 116 to a screen driver, which may display the images on display screen 132 as a series of pixels. As a result, the user may interact with mobile phone 102 by using input device 128 to provide input to operating system 116 and/or applications and receiving output from operating system 116 and/or applications through display screen 132.

Wireless transceiver 130 may allow mobile phone 102 to connect to one or more wireless networks, such as wireless local area networks (LANs) and/or mobile devices networks. Mobile phone 102 may also communicate with one or more locations on the network(s) by sending and/or receiving data over the network(s) using wireless transceiver 130. For example, mobile phone 102 may use wireless transceiver 130 to make calls, retrieve web pages, download and upload files, and send and receive emails over the network(s).

In one or more embodiments of the invention, calls placed and/or received on mobile phone 102 are connected using a communication subsystem 104 within operating system 116. In one or more embodiments of the invention, communication subsystem 104 may include software modules that coordinate the use of telephony-associated hardware components (e.g., wireless transceiver 130, speaker, microphone, etc.) on mobile phone 102. Communication subsystem 104 may also implement one or more mobile communication protocols and/or standards, such as Global System for Mobile communications (GSM), code division multiple access (CDMA), generic access network (GAN), and/or General Packet Radio Service (GPRS).

As mentioned above, the user may use utilities on mobile phone 102 by interacting with GUI 118 through input device 128 and display screen 132. To enable access to the functionality of mobile phone 102, GUI 118 may include a variety of GUI elements, such as icons, menus, sub-menus, windows, toolbars, thumbnails, pop-ups, and/or other visual components. The GUI elements may also include text, labels, and/or text navigation to provide additional information and available actions to the user. The user may access one or more functions of mobile phone 102 through direct manipulation of one or more GUI elements. For example, the user may run an application by pointing to and selecting (e.g., double-clicking) an icon associated with the application. The user may also perform actions such as moving the cursor or visual indicator, scrolling, dragging, cutting, copying, pasting, and/or selecting an area of display screen 132.

Those skilled in the art will appreciate that mobile phone 102 may include a large number of hardware and software components. For example, mobile phone 102 may include multiple I/O components, a high-speed processor, one or more storage devices, multiple wireless transceivers, multiple sensors, a full operating system and one or more application suites. Each hardware and/or software component may run by consuming power from a battery (not shown) within mobile phone 102. However, the user may not use or need all hardware and/or software features of mobile phone 102 at all times.

Specifically, the user may not require the use of various applications and/or hardware components on mobile phone 102 if the user is placing or receiving an emergency call. In addition, the execution of such applications and/or hardware components may cause the battery to drain unnecessarily as the user conducts the emergency call. Further, the emergency call may end prematurely if the battery runs out of power from such elevated rates of consumption by one or more components on mobile phone 102.

In one or more embodiments of the invention, communication subsystem 104 includes an emergency-mode processor 106 to process emergency calls. Emergency-mode processor 106 may determine if a phone call made or received by mobile phone 102 is an emergency call. If the phone call is an emergency call, emergency-mode processor 106 may activate an emergency mode of the mobile phone to handle the phone call. Further, the emergency mode may include mechanisms to prolong the length of the emergency call and avert premature termination of the emergency call.

In particular, the emergency-mode processor 106 may determine an emergency call based on a phone number associated with the phone call. For example, calls to well-known emergency numbers such as 911 may be automatically classified as emergency calls. The user may also specify a set of emergency numbers, which are stored in an emergency number list 108. Calls made to phone numbers on emergency number list 108 may also be classified as emergency calls by emergency-mode processor 106. On the other hand, the user may manually specify an emergency call by, for example, pressing a button, entering a code corresponding to the emergency mode, and/or providing other input using input device 128.

Once the emergency mode is activated, emergency-mode processor 106 may perform one or more actions to prolong the emergency call. To prevent an inadvertent end to the emergency call, emergency-mode processor 106 may make the emergency call harder to disconnect. For example, if the user presses a button to disconnect an emergency call, emergency-mode processor 106 may query the user for confirmation before disconnecting the call. The confirmation may be in the form of a button, a code or password, a verbal acknowledgement, and/or other input by the user. Emergency-mode processor 106 may even disable the user's ability to disconnect the call. As a result, the call may only be disconnected by someone (e.g., an emergency operator) on the other end of the emergency call. Further, the user may select settings to specify the level of difficulty and the methods of disconnecting emergency calls. The user may also select settings for each individual emergency number. For example, the user may disable the ability to disconnect a 911 call while activating a disconnect confirmation in other emergency calls.

Emergency-mode processor 106 may also preserve battery power on mobile phone 102. In one or more embodiments of the invention, battery power may be preserved by disabling non-essential hardware components, reducing power to display screen 132, disabling software applications, and/or reducing processor speeds. A non-essential hardware component may correspond to any hardware component that is not necessary for the emergency call to be conducted. For example, non-essential hardware components may include Bluetooth and Wi-Fi transceivers, secondary I/O devices, and/or camera sensors. However, hardware components that may be helpful in emergency situations, such as a GPS transceiver, may continue to be active in emergency mode.

Furthermore, emergency-mode processor 106 may enable emergency phrase buttons on mobile phone 102. The emergency phrase buttons may be shown on display screen 132, for example. Alternatively, the user may program various input devices on mobile phone 102 to correspond to one or more emergency phrase buttons. In one or more embodiments of the invention, the emergency phrase buttons are used by the user to communicate in the emergency call if the user is unable to speak. In one or more embodiments of the invention, the emergency phrase buttons allow preset and/or pre-recorded audio clips of phrases to be played in the emergency call. The phrases may be provided by mobile phone 102 and/or specified by the user. In addition, the phrases may be stored as audio files in mobile phone 102 or generated in real-time using a speech synthesizer on mobile phone 102. For example, if the user is choking, the user may press an emergency phrase button that states his/her physical condition to a 911 operator. The user may also press buttons to communicate other information, such as his/her location, and/or request the 911 operator to contact a friend and/or family member.

Figure 2A:
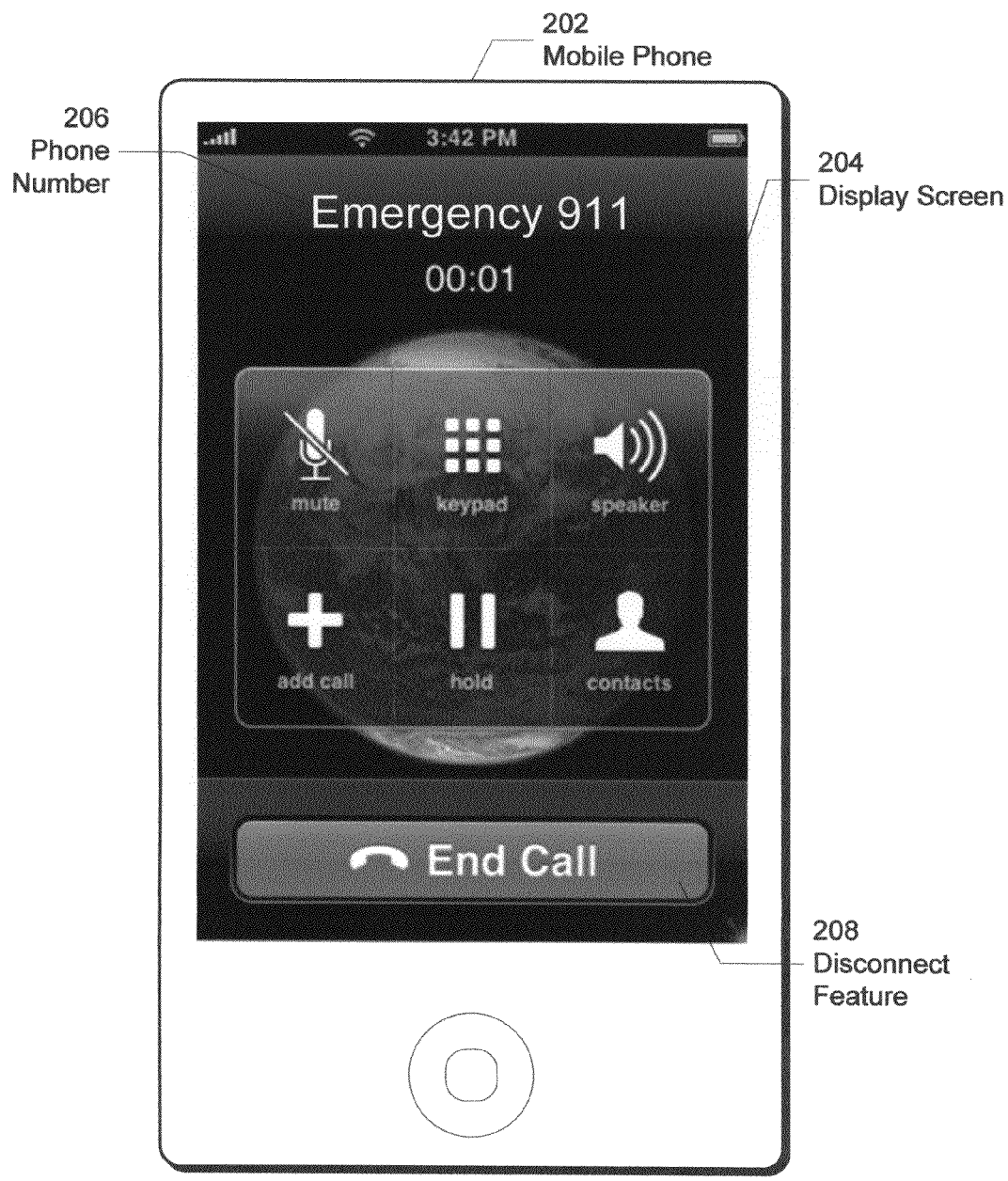
FIGS. 2A-2E show exemplary screenshots in accordance with an embodiment of the present invention.

FIG. 2A shows an exemplary screenshot of an emergency call in accordance with an embodiment of the present invention. The screenshot is shown on a display screen 204 of a mobile phone 202. In one or more embodiments of the invention, the screenshot corresponds to an emergency mode of mobile phone 202 after the user has placed an emergency call. As shown in FIG. 2A, a phone number 206 of the emergency call corresponds to 911. Phone number 206 may be dialed by the user or connected to the user via an incoming call. As mentioned above, phone number 206 may be classified as an emergency number by mobile phone 202, or phone number 206 may be specified as an emergency number by the user. In one or more embodiments of the invention, emergency numbers provided by the user are stored in an emergency number list within mobile phone 202. Calls made to or from numbers on the emergency number list may be classified as emergency calls by mobile phone 202.

As shown in FIG. 2A, the screenshot also includes a disconnect feature 208 that allows the user to end the emergency call. Disconnect feature 208 may be activated, for example, by contacting a region of display screen 204 corresponding to disconnect feature 208, using a voice command, interacting with a wired or wireless headset in communication with mobile phone 202, and/or using other input methods. However, disconnect feature 208 may be disabled when mobile phone 202 is in emergency mode. Alternatively, the user may be prompted to confirm the disconnection of the call, as shown in FIG. 2B.

Figure 2B:
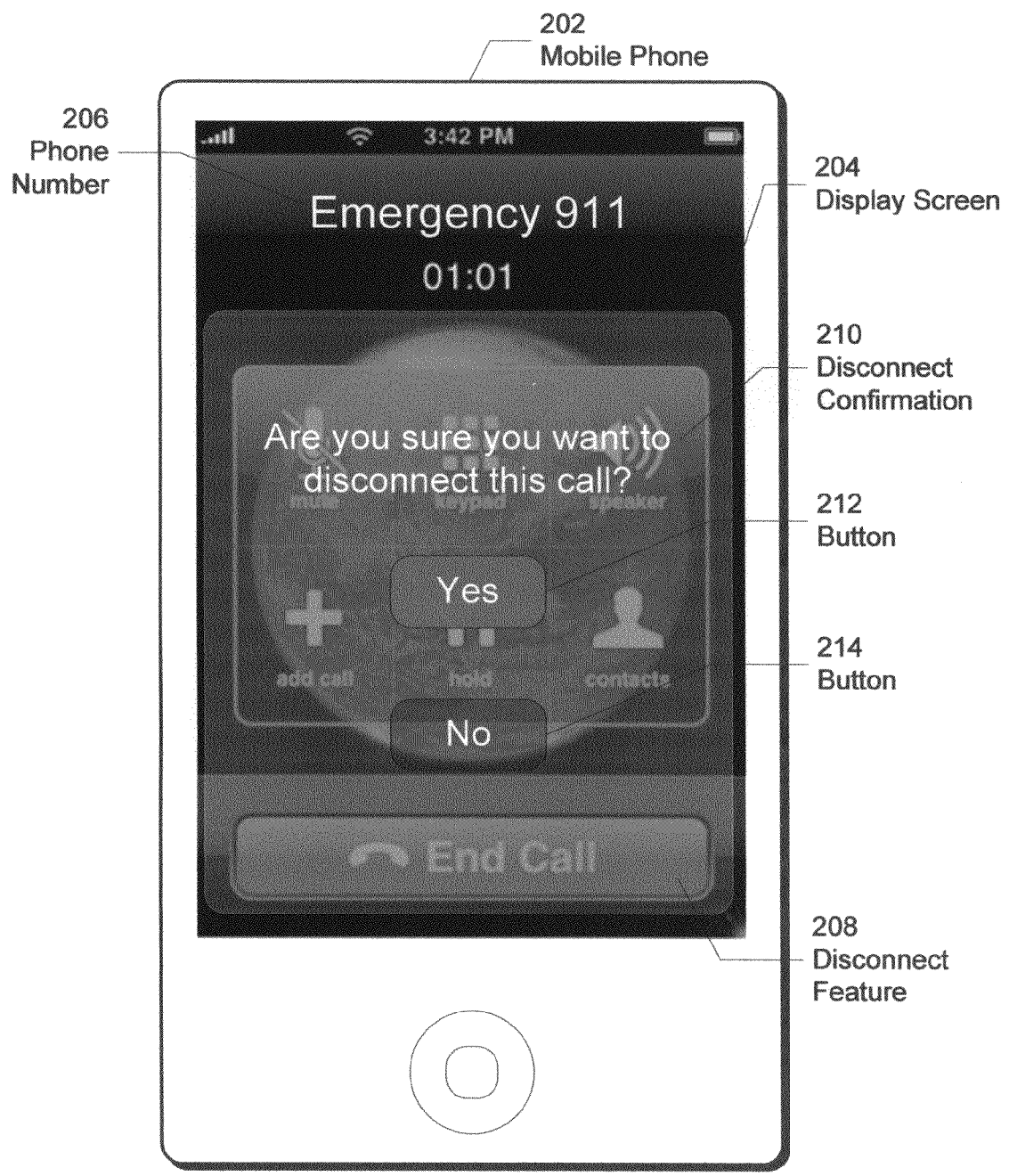

FIG. 2B shows an exemplary screenshot of an emergency call in accordance with an embodiment of the present invention. In FIG. 2B, disconnect feature 208 has been activated by the user. However, because mobile phone 202 is in emergency mode, a disconnect confirmation 210 is displayed to the user. In one or more embodiments of the invention, disconnect confirmation 210 is used to prevent inadvertent disconnection of emergency calls. For example, the user may inadvertently activate disconnect feature 208 by accidentally contacting one or more areas of display screen 204 corresponding to disconnect feature 208.

To disconnect the call, the user may press button 212. To remain on the call, the user may press button 214. In one or more embodiments of the invention, the emergency call continues until the user has pressed button 212 or the call is disconnected from the other end. In other words, the emergency call is not interrupted if the user accidentally presses the disconnect feature 208 button. Alternatively, mobile phone 202 may include other mechanisms for confirming or canceling disconnect feature 208. For example, mobile phone 202 may accept a voice command corresponding to the confirmation or cancellation of disconnect feature 208 by the user. As described above, the voice command may be spoken into a microphone on mobile phone 202 or into a wired or wireless headset connected to mobile phone 202.

Figure 2C:
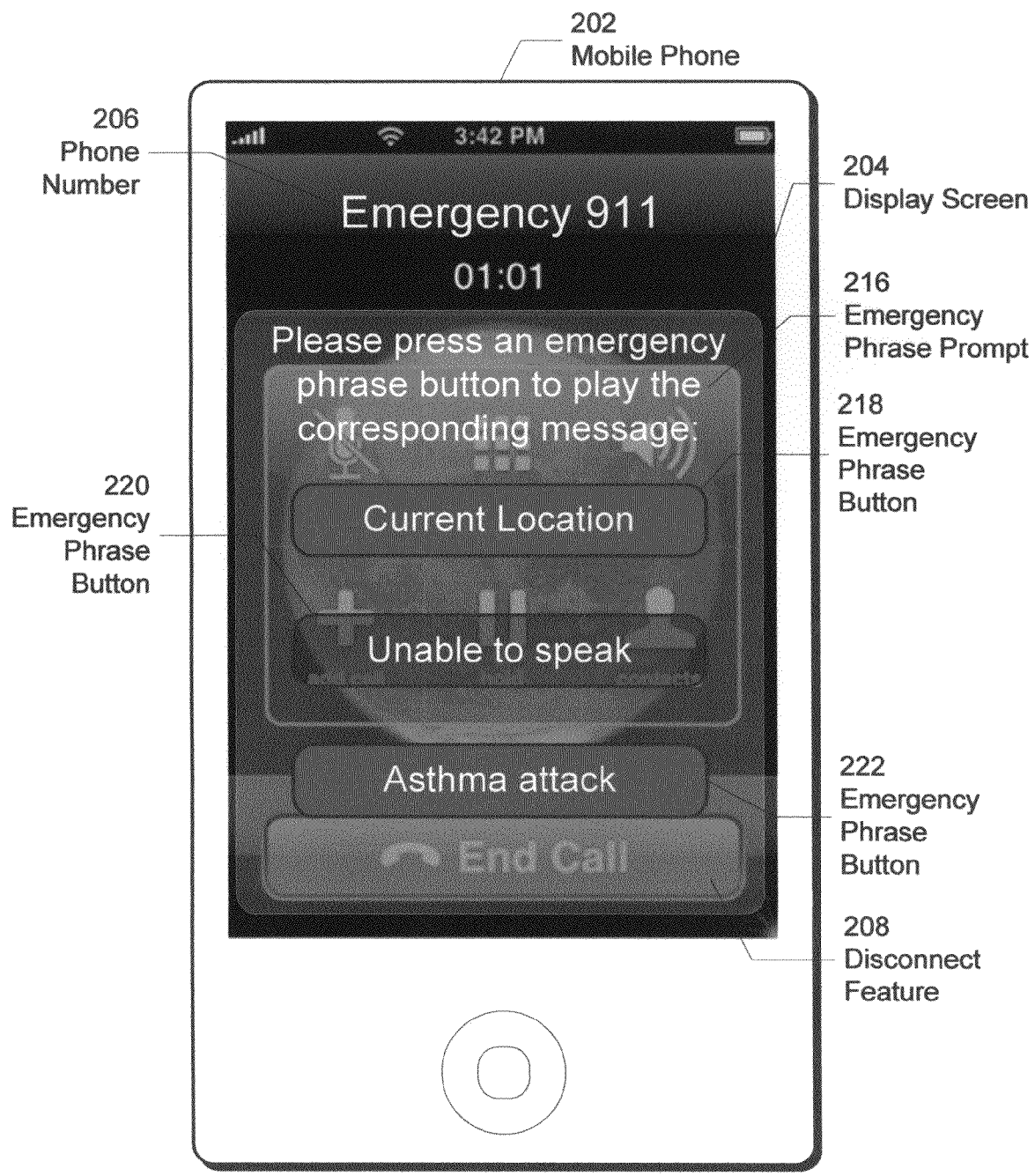

FIG. 2C shows an exemplary screenshot of an emergency call in accordance with an embodiment of the present invention. In FIG. 2C, the user has activated an emergency phrase prompt 216 during the call. As with other elements of the emergency call, emergency phrase prompt 216 may be activated by using one or more input devices on mobile phone 202, using a voice command, and/or using other input methods. Emergency phrase prompt 216 includes a set of emergency phrase buttons 218-222 for the user to press.

As described above, emergency phrase buttons 218-222 may be used by the user to communicate in the emergency call if the user is unable to speak. Emergency phrase buttons 218-222 may be provided by mobile phone 202 and/or added by the user. Specifically, emergency phrase buttons 218-222 may enable playback of preset and/or pre-recorded audio clips of phrases during the emergency call. Moreover, the phrases may be stored as audio files in mobile phone 102 and/or generated in real-time using a speech synthesizer on mobile phone 102.

For example, emergency phrase button 218 may play a preset message that communicates the user's location (e.g., geographic coordinates, street intersection, etc.) into the phone call. As mentioned above, hardware components on mobile phone 202 that may be helpful in an emergency situation may remain active during the emergency call. As a result, the user's location may be established using a GPS transceiver, wireless transceiver, and/or other active hardware component on mobile phone and appended to the phrase corresponding to emergency phrase button 218.

Emergency phrase button 220 may play a preset or prerecorded message communicating the user's inability to speak during the emergency call. The message may be provided by mobile phone 202 and/or recorded by the user. In addition, the message may generically state the user's inability to speak, or the message may be customized to provide additional detail, such as a specific physical condition, that prevents the user from speaking.

Emergency phrase button 222 may play a preset or prerecorded message communicating an asthma attack currently experienced by the user. As with emergency phrase buttons 218-220, the message corresponding to emergency phrase button 222 may be prerecorded and/or preset. In addition, the message may contain additional information, such as descriptions of effective treatments for the user's asthma attacks.

Figure 2D:
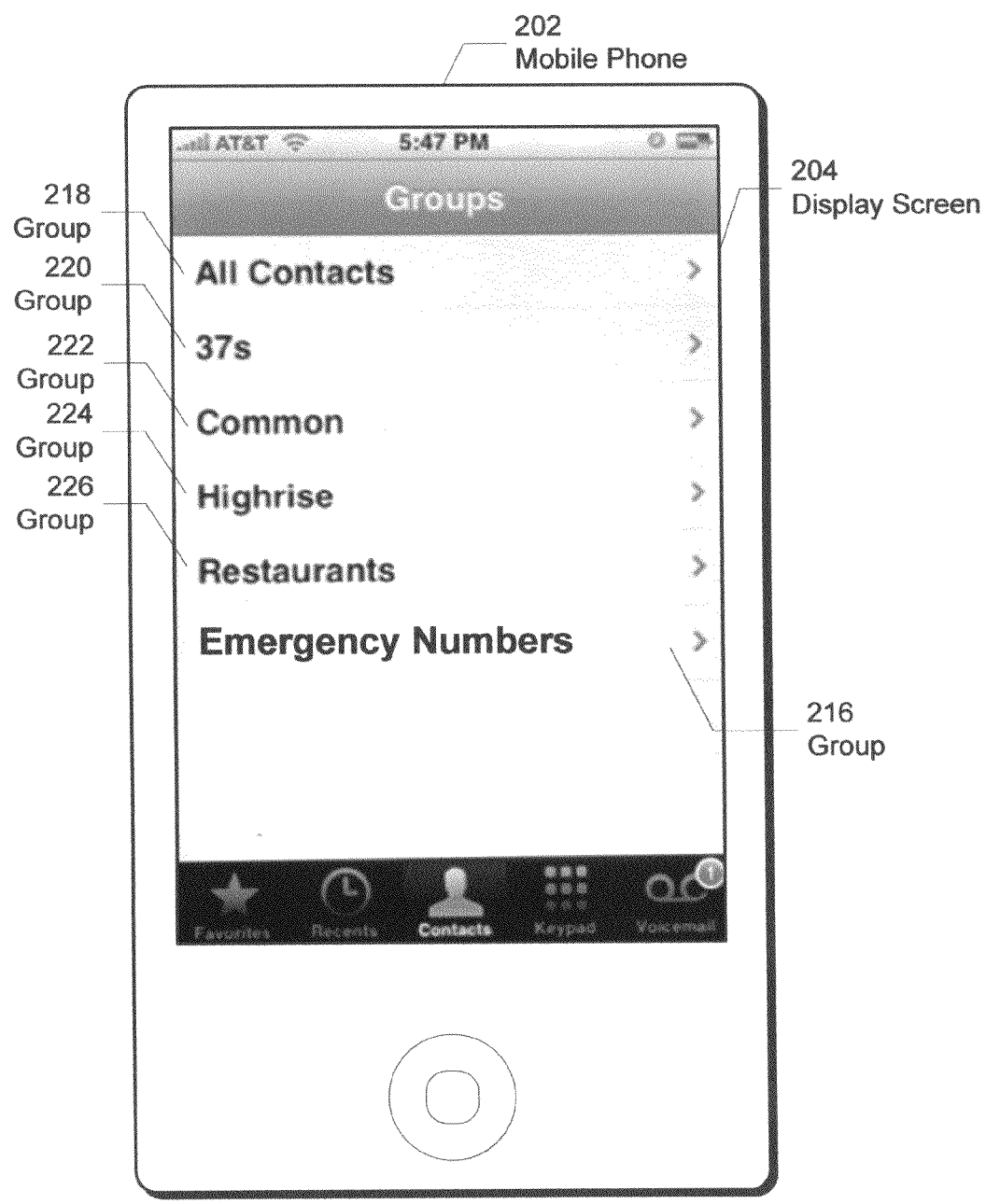

FIG. 2D shows an exemplary screenshot of a contact group list in accordance with an embodiment of the present invention. Display screen 204 shows a set of groups 216-226 associated with contacts stored on mobile phone 202. Contacts in each group may be classified based on a common attribute. For example, contacts stored in group 226 may correspond to restaurants visited by the user. Similarly, all contacts of the user may be accessed using group 218.

In one or more embodiments of the invention, Group 216 corresponds to an emergency number list. As described above, the user may add emergency numbers to the emergency number list. When calls are made to and/or from the emergency number list, mobile phone 202 may activate an emergency mode to prolong the length of the call. The numbers stored in the emergency number list may include, for example, police stations, fire stations, medical emergency lines, crisis hotlines, emergency family numbers, and/or work-related numbers.

Figure 2E:
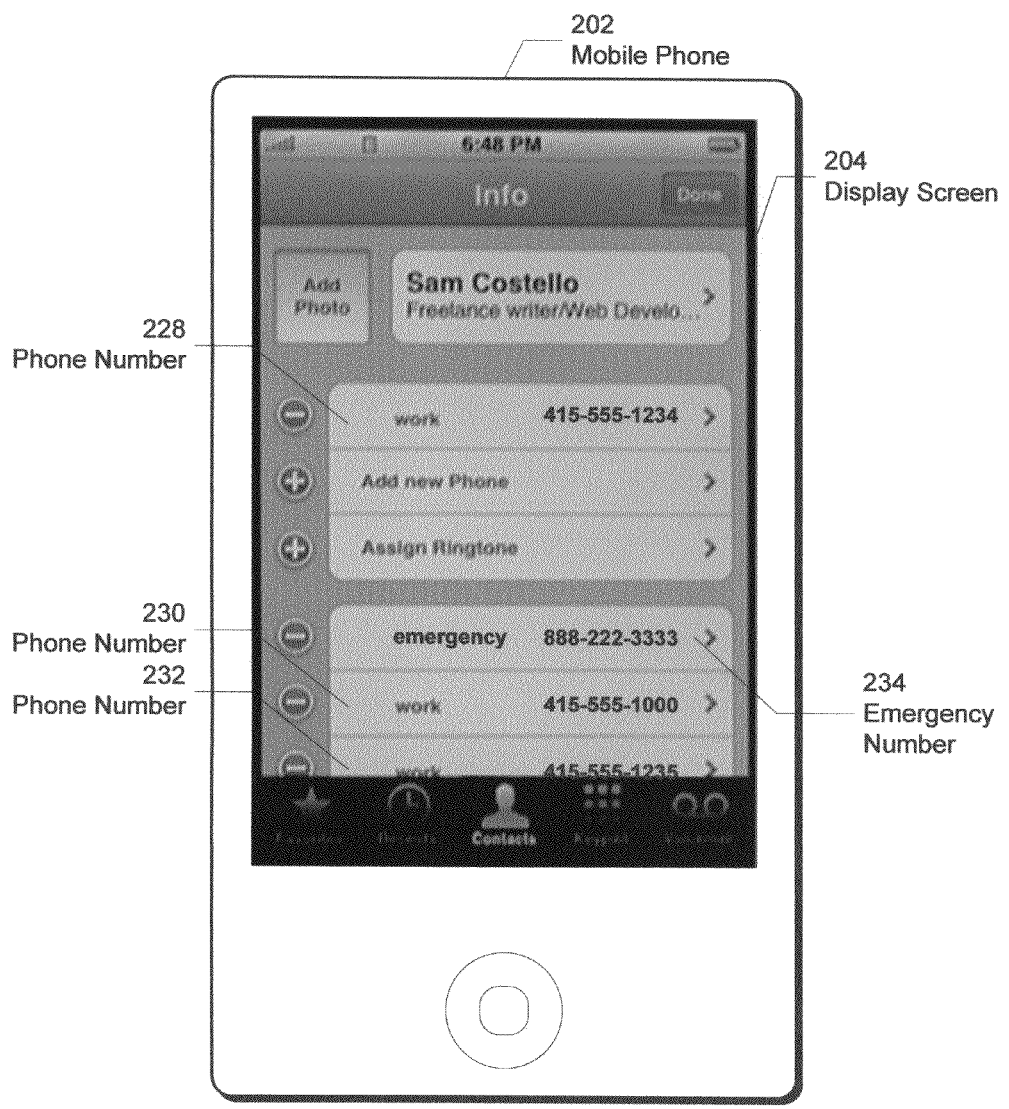

FIG. 2E shows an exemplary screenshot of a contact in accordance with an embodiment of the present invention. As shown in FIG. 2E, the contact is associated with three phone numbers 228-232 and an emergency number 234. The user may make or receive calls to or from phone numbers 228-232 in a normal operating mode of mobile phone 202. However, if the user is connected to a call with emergency number 234, mobile phone 202 may activate an emergency mode to prolong the length of the call, as described above.

In one or more embodiments of the invention, emergency number 234 is also stored in an emergency number list. In addition, the user may specify settings with respect to emergency number 234. For example, the user may enable or disable an ability to disconnect calls with emergency number 234, or the user may increase the difficulty of disconnecting calls with emergency number 234. The user may also specify emergency phrase buttons that are enabled when a call with emergency number 234 is made. As mentioned previously, the emergency phrase buttons may allow the user to communicate with emergency number 234 if the user is unable to speak.

Figure 3:
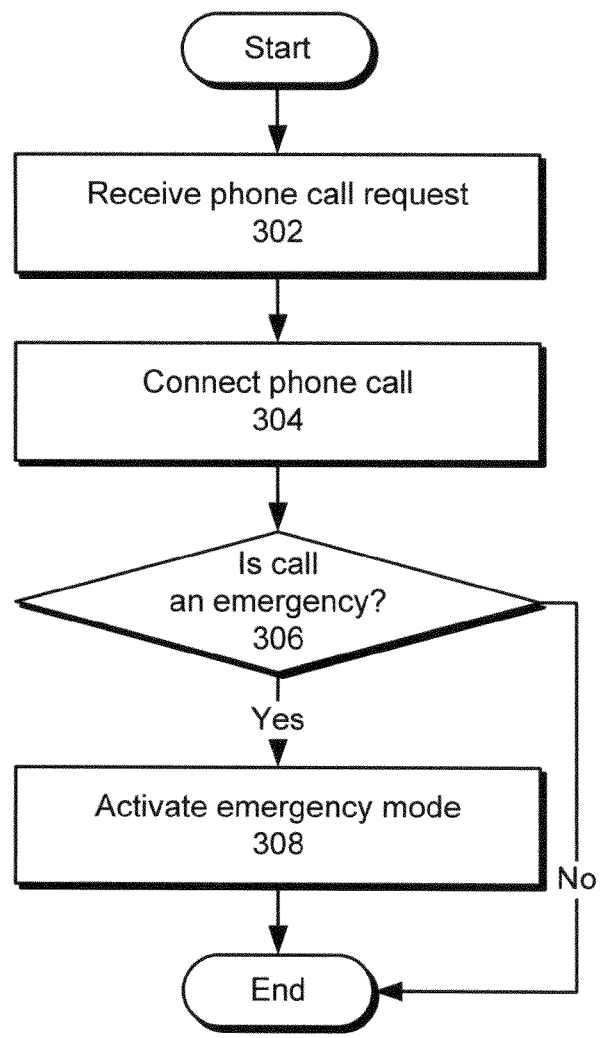
FIG. 3 is a flow diagram illustrating the processing of phone calls on a mobile phone in accordance with an embodiment of the present invention.

FIG. 3 is a flow diagram illustrating the processing of phone calls on a mobile phone in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a phone call request is received (operation 302). The phone call request may correspond to an incoming or outgoing call to or from a mobile phone. The phone call is then connected (operation 304) by the mobile phone. A determination may be made regarding whether the phone call is an emergency (operation 306). As described above, the phone call may be classified as an emergency based on a phone number associated with the call. For example, the phone number may be a well-known emergency number, such as 911. The phone number may also be specified by the user in an emergency number list in the mobile phone. Alternatively, the user may manually designate a call as an emergency by pressing a button, using a voice command, and/or providing other input upon connecting the call. If the call is an emergency, an emergency mode is activated (operation 308). If the call is a normal call, the emergency mode is not activated and the call is conducted normally.

Figure 4:
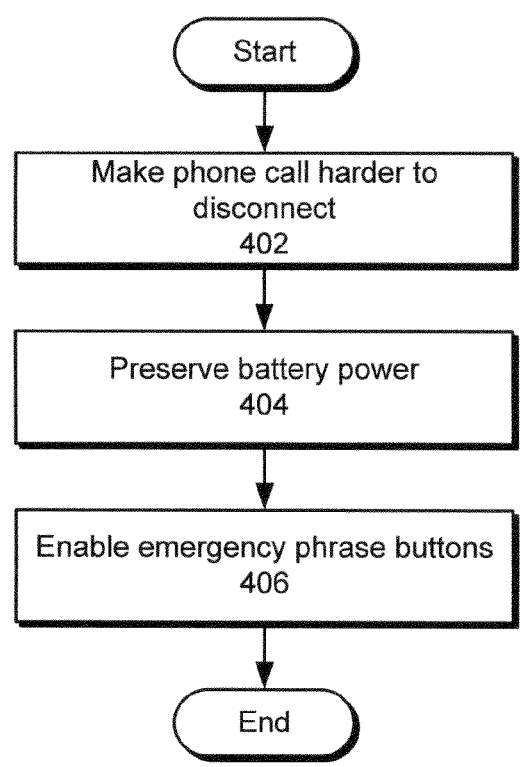
FIG. 4 is a flow diagram of the process of activating the emergency mode in accordance with an embodiment of the present invention.

FIG. 4 is a flow diagram of the process of activating the emergency mode in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

First, the phone call is made harder to disconnect (operation 402). This may be done by prompting the user to confirm a disconnect feature of the mobile phone or by disabling the disconnect feature altogether. Battery power in the mobile phone may also be preserved (operation 404). As mentioned previously, battery power may be preserved by disabling non-essential hardware components, reducing power to the mobile phone's display screen, disabling software applications on the mobile phone, and/or reducing processor speeds on the mobile phone. Finally, emergency phrase buttons may be enabled (operation 406) on the mobile phone. The emergency phrase buttons may allow the user to communicate over the phone call when he/she is unable to talk. As described above, the emergency phrase buttons may correspond to prerecorded and/or preset phrases that are played when the buttons are pressed. In addition, the phrases may be provided by the mobile phone or programmed into the mobile phone by the user.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing a phone call, comprising:
  connecting the phone call from a mobile phone;
  determining whether the phone call is an emergency call; and
  if the phone call is an emergency call, activating an emergency mode of the mobile phone to handle the phone call, wherein the emergency mode prolongs the length of the phone call, and wherein prolonging the length of the phone call comprises, if a user presses a button to disconnect the emergency call:
    querying the user for confirmation before disconnecting the phone call, wherein the confirmation comprises a code, a password, or a verbal acknowledgement.

2. The method of claim 1, wherein the emergency mode makes the phone call harder to disconnect.

3. The method of claim 1, wherein the emergency mode preserves battery power on the mobile phone.

4. The method of claim 3, wherein the battery power is preserved by:
   disabling non-essential hardware components on the mobile phone;
   reducing power to a display screen of the mobile phone;
   disabling software applications on the mobile phone; or
   reducing processor speeds on the mobile phone.

5. The method of claim 1, wherein the emergency mode enables emergency phrase buttons on the mobile phone.

6. The method of claim 1, wherein the phone call is determined to be an emergency call based on a phone number associated with the phone call.

7. The method of claim 6, wherein the phone number is stored as an emergency number in the mobile phone.

8. The method of claim 1, wherein the emergency mode can be selected by a user of the mobile phone.

9. A mobile phone, comprising:
   a communication subsystem configured to connect a phone call from the mobile phone, comprising:
   an emergency-mode processor configured to:
      determine whether the phone call is an emergency call; and
      if the phone call is an emergency call, activate an emergency mode of the mobile phone to handle the phone call, wherein the emergency mode prolongs the length of the call, and wherein prolonging the length of the phone call comprises, if a user presses a button to disconnect the emergency call:
         querying the user for confirmation before disconnecting the phone call, wherein the confirmation comprises a code, a password, or a verbal acknowledgement.

10. The mobile phone of claim 9, wherein the emergency-mode processor is further configured to make the phone call harder to disconnect.

11. The mobile phone of claim 9, wherein the emergency-mode processor is further configured to preserve battery power on the mobile phone.

12. The mobile phone of claim 11, wherein the battery power is preserved by:
   disabling non-essential hardware components on the mobile phone;
   reducing power to a display screen of the mobile phone;
   disabling software applications on the mobile phone; or
   reducing processor speeds on the mobile phone.

13. The mobile phone of claim 9, wherein the phone call is determined to be an emergency based on a phone number associated with the phone call.

14. The mobile phone of claim 13, further comprising an emergency number list configured to store the phone number as an emergency number.

15. The mobile phone of claim 9, wherein the emergency-mode processor is further configured to enable emergency phrase buttons on the mobile phone.

16. The mobile phone of claim 9, wherein the emergency mode is selected by a user of the mobile phone.

17. A non-transitory computer-readable storage medium storing instructions that when executed by a computer cause the computer to perform a method for processing a phone call, the method comprising:
   connecting the phone call from a mobile phone;
   determining whether the phone call is an emergency call; and
   if the phone call is an emergency call, activating an emergency mode of the mobile phone to handle the phone call, wherein the emergency mode prolongs the length of the phone call by preserving battery power on the mobile phone, wherein the emergency mode makes the phone call harder to disconnect, and wherein prolonging the length of the phone call comprises, if a user presses a button to disconnect the emergency call:
      querying the user for confirmation before disconnecting the phone call, wherein the confirmation comprises a code, a password, or a verbal acknowledgement.

18. The computer-readable storage medium of claim 17, wherein the emergency mode preserves battery power on the mobile phone by:
   disabling non-essential hardware components on the mobile phone;
   reducing power to a display screen of the mobile phone;
   disabling software applications on the mobile phone; or
   reducing processor speeds on the mobile phone.

19. The computer-readable storage medium of claim 17, wherein the emergency mode enables emergency phrase buttons on the mobile phone.

20. The computer-readable storage medium of claim 17, wherein the phone call is determined to be an emergency based on a phone number associated with the phone call.

21. The computer-readable storage medium of claim 17, wherein the phone number is stored as an emergency number in the mobile phone.

22. The computer-readable storage medium of claim 17, wherein the emergency mode can be selected by a user of the mobile phone.

* * * * *